US010399287B2

United States Patent
Schibsbye

(10) Patent No.: US 10,399,287 B2
(45) Date of Patent: *Sep. 3, 2019

(54) MANUFACTURING ARRANGEMENT FOR THE MANUFACTURE OF A ROTOR BLADE

(71) Applicant: Siemens Gamesa Renewable Energy A/S, Brande (DK)

(72) Inventor: Karsten Schibsbye, Fredericia (DK)

(73) Assignee: SIEMENS GAMESA RENEWABLE ENERGY A/S (DK)

( * ) Notice: Subject to any disclaimer, the term of this patent is extended or adjusted under 35 U.S.C. 154(b) by 687 days.

This patent is subject to a terminal disclaimer.

(21) Appl. No.: 14/890,293

(22) PCT Filed: May 28, 2014

(86) PCT No.: PCT/EP2014/001452
§ 371 (c)(1),
(2) Date: Nov. 10, 2015

(87) PCT Pub. No.: WO2014/191110
PCT Pub. Date: Dec. 4, 2014

(65) Prior Publication Data
US 2016/0114539 A1    Apr. 28, 2016

(30) Foreign Application Priority Data

May 31, 2013  (EP) .................................... 13170098

(51) Int. Cl.
*B29C 70/38* (2006.01)
*F01D 5/14* (2006.01)
(Continued)

(52) U.S. Cl.
CPC ............ *B29C 70/382* (2013.01); *B29B 15/08* (2013.01); *B29C 31/04* (2013.01); *B29C 70/06* (2013.01);
(Continued)

(58) Field of Classification Search
CPC ........ B29C 70/382; B29C 70/541; F01D 5/14
See application file for complete search history.

(56) References Cited

U.S. PATENT DOCUMENTS 4,679,291 A *  7/1987  Schmeal et al. ........ B27F 7/006
                                                       156/249
6,096,164 A *  8/2000  Benson et al. ........ B29C 53/602
                                                       156/425
(Continued)

FOREIGN PATENT DOCUMENTS

CN      102650605 A    8/2012
EP       0154321 A1    9/1985
(Continued)

OTHER PUBLICATIONS

Chinese Office Action dated Jul. 6, 2016; Application No. 201480031252.9; 20 Pgs.
(Continued)

*Primary Examiner* — Kevin L Lee
(74) *Attorney, Agent, or Firm* — Schmeiser Olsen & Watts, LLP

(57) ABSTRACT

A manufacturing arrangement realized for the manufacture of a rotor blade, including a pair of tracks arranged along the longitudinal sides of a blade mold, a first gantry assembly realized to span the track pair and to carry a first tool arrangement, which first tool arrangement includes at least a fiber distributor, a second gantry assembly realized to span the track pair and to carry a second tool arrangement, and a control arrangement realized to effect a coordinated movement of the gantry assemblies along the track pair and to coordinate the operation of the second tool arrangement with the operation of the first tool arrangement, is provided. A manufacturing line, a method of manufacturing a rotor blade, and a wind turbine rotor blade are further provided.

16 Claims, 6 Drawing Sheets

(51) Int. Cl.
- *B29C 70/54* (2006.01)
- *B29D 99/00* (2010.01)
- *B29B 15/08* (2006.01)
- *B29C 31/04* (2006.01)
- *B29C 70/06* (2006.01)
- *B65H 49/18* (2006.01)
- *B65H 54/02* (2006.01)
- *F03D 1/06* (2006.01)
- *B29L 31/08* (2006.01)
- *B29K 105/12* (2006.01)
- *B29K 307/04* (2006.01)
- *B29K 309/08* (2006.01)

(52) U.S. Cl.
CPC .............. *B29C 70/38* (2013.01); *B29C 70/54* (2013.01); *B29C 70/541* (2013.01); *B29D 99/0028* (2013.01); *B65H 49/18* (2013.01); *B65H 54/02* (2013.01); *F01D 5/14* (2013.01); *F01D 5/147* (2013.01); *F03D 1/0675* (2013.01); *B29K 2105/12* (2013.01); *B29K 2307/04* (2013.01); *B29K 2309/08* (2013.01); *B29L 2031/085* (2013.01); *F05D 2230/60* (2013.01); *Y02E 10/721* (2013.01)

(56) References Cited

U.S. PATENT DOCUMENTS

| | | | |
|---|---|---|---|
| 9,757,904 B2* | 9/2017 | Ufer et al. | B29B 11/16 |
| 10,040,255 B2* | 8/2018 | Schibsbye | B29C 70/38 |
| 2009/0139654 A1 | 6/2009 | Wampler et al. | |
| 2012/0138218 A1 | 6/2012 | Dean | |
| 2016/0107397 A1* | 4/2016 | Schibsbye | B29C 70/38 |
| | | | 242/388.6 |

FOREIGN PATENT DOCUMENTS

| | | |
|---|---|---|
| EP | 2014449 A1 | 1/2009 |
| EP | 2283995 A1 | 2/2011 |
| EP | 2808158 A1 | 12/2014 |
| EP | 2851183 A1 | 3/2015 |
| WO | WO 8400351 A1 | 2/1984 |
| WO | WO2013/064152 A1 | 5/2013 |

OTHER PUBLICATIONS

International Search Report; PCT/EP2014/001452; dated May 28, 2014; 3 Pgs.

* cited by examiner

MANUFACTURING ARRANGEMENT FOR THE MANUFACTURE OF A ROTOR BLADE

CROSS-REFERENCE TO RELATED APPLICATIONS

This application claims priority to PCT Application No. PCT/EP2014/001452, having a filing date of May 28, 2014, based off of European Application No. 13170098.1, having a filing date of May 31, 2013, the entire contents of which are hereby incorporated by reference.

FIELD OF TECHNOLOGY

The following describes a manufacturing arrangement for the manufacture of a rotor blade; a manufacturing line; a method of manufacturing a rotor blade; and a wind turbine rotor blade.

BACKGROUND

A wind turbine rotor blade is usually made of a reinforced fiber material, and is constructed by laying up a suitable fiber arrangement in two mold halves (one for the suction side of the blade and one for the pressure side of the blade). In the known methods, the fiber layup is infused with a resin to bond the fibers and fiber layers and then cured to harden. The blade halves are joined, and the outer surface of the blade can be treated as necessary.

The desired aerodynamic shape of a wind turbine rotor blade airfoil, the inclusion of a circular root section for connection to a hub, and the requirements of lightness as well as structural strength all add up to a costly and complex manufacturing process. For example, the process of laying out fiber material manually in the blade mold is very time consuming, leading to a lengthy total production time of a blade. Furthermore, manual layup is difficult and even if great care is taken, faulty positioning of the fiber material cannot be ruled out. Inconsistencies in the fiber layup—for example too thin or too thick fiber layers, over-tensioned or under-tensioned fiber rovings, etc.—can lead to structural deformities in the finished rotor blade.

Different regions of a wind turbine rotor blade are subject to different types of loading during operation, and some regions of the blade are subject to greater loading than other regions. A certain minimum material thickness is therefore necessary in order to avoid cracks developing in the blade. However, an increase in material thickness will result in an increase in the weight of the blade. In conventional manufacturing techniques, the fiber material layup may not properly consider these factors, so that the resulting blade may not exhibit the necessary structural strength, or the blade may be excessively heavy so that handling during transport and installation is made more difficult and time-consuming.

SUMMARY

An aspect relates to a reliable, more economical, and less time-consuming way of manufacturing a structurally robust wind turbine rotor blade.

According to embodiments of the invention, the manufacturing arrangement is realized for the manufacture of a rotor blade and comprises a pair of tracks arranged along the longitudinal sides of a blade mold; a first gantry assembly realized to span the track pair and to carry a first tool arrangement, which first tool arrangement comprises a fiber distributor; a second gantry assembly realized to span the track pair and to carry a second tool arrangement realized to support the first tool arrangement; and a control arrangement realized to effect a coordinated movement of the gantry assemblies along the track pair and to coordinate the operation of the second tool arrangement with the operation of the first tool arrangement.

The tool arrangements are operated to perform functions such as distributing fiber material in the molds during the layup procedure. In the context of embodiments of the invention, a "tool arrangement" can comprise any tool or device that can be used actively or passively to perform or fulfil a function. By controlling the movement of the gantries along the track pair and coordinating the tool arrangements at the same time, the manufacturing arrangement according to embodiments of the invention allows a favorably efficient and accurate fiber layup to be performed, since fiber material can be supplied to the fiber distributor in a controlled and pre-determined manner and other layup-related functions can be carried out as required. In the context of embodiments of the invention, the control arrangement can control the operation and function of any controllable tool or device of the tool arrangements, and can control the rate(s) at which the first and second gantries move along the tracks. The control of the gantries and tool arrangements in this way can be regarded as a type of choreography. A further advantage of the manufacturing arrangement according to embodiments of the invention is that it significantly shortens the "time in mold" for a blade. This leads to a more cost-effective manufacturing process, since the blade molds are the most expensive components of rotor blade manufacture. Effectively, fewer molds are required when a plurality of rotor blades is to be manufactured. Furthermore, the production time of each individual rotor blade is decreased by the efficient and coordinated control of the tool arrangements that are operated.

According to embodiments of the invention, the manufacturing line is realized for the manufacture of wind turbine rotor blades, and comprises a first manufacturing arrangement according to embodiments of the invention for manufacturing an upper rotor blade half, wherein the track pair of the first manufacturing arrangement is arranged along the longitudinal sides of an upper blade mold; and a second manufacturing arrangement according to embodiments of the invention for manufacturing a lower blade half, wherein the track pair of the second manufacturing arrangement is arranged along the longitudinal sides of a lower blade mold; and wherein the control arrangements of the first and second manufacturing arrangements are realized to coordinate the operation of the tool arrangements such that the blade halves are manufactured essentially simultaneously.

Here also, the manufacturing line according to embodiments of the invention can achieve a significant cost reduction in the manufacture of multiple rotor blades. Both blade halves of a single rotor blade can be prepared essentially at the same time, and the gantry assemblies and tools of both manufacturing arrangements can be optimally utilized. For example, a gantry assembly with tool arrangement can be put to use essentially continuously without any significant idle time. As soon as one upper blade half and one lower blade half have been prepared, the gantry assemblies and tool arrangements can be used to commence preparation of a further rotor blade.

According to embodiments of the invention, the method of manufacturing a rotor blade comprises the steps of
(A) arranging a pair of tracks along the longitudinal sides of a blade mold;

(B) arranging a first gantry assembly to span the track pair and placing a first tool arrangement on the first gantry;

(C) arranging a second gantry assembly to span the track pair and placing a second tool arrangement on the second gantry;

(D) operating a control arrangement to effect a coordinated movement of the gantry assemblies along the track pair and to coordinate the operation of the second tool arrangement with the operation of the first tool arrangement.

An advantage of the method according to embodiments of the invention is that is possible to produce the halves of the blade in the molds essentially simultaneously, so that the blade halves correspond in terms of quality.

According to embodiments of the invention, the wind turbine rotor blade is manufactured using such a method. An advantage of the rotor blade according to embodiments of the invention is that the fiber layup can be completed in a controlled and efficient manner by the coordinated operation of the tool arrangements. The result is a high-quality and even distribution of fiber material, which is obtained in a significantly shorter time compared to conventional manufacturing techniques. Another advantage is that the second tool arrangement can always provide a specific quality of fiber material to the fiber distributor, so that material thickness can be adjusted according to the region of the blade in which the fiber material is being laid. In this way, the method according to embodiments of the invention makes it possible to obtain a blade with superior structural qualities even though its manufacturing time may be significantly shorter than a blade made using a prior art manufacturing technique.

Particularly advantageous embodiments and features of embodiments of the invention are given by the dependent claims, as revealed in the following description. Features of different claim categories may be combined as appropriate to give further embodiments not described herein.

The manufacturing arrangement and method according to embodiments of the invention are particularly suited to a "dry layup" process in which fiber (usually glass fiber, carbon fiber or similar) is distributed or laid in the mold in an initial stage. Resin is infused into the fiber material only after the two blade mold halves have been joined. The rotor blade is therefore essentially manufactured in one piece, since the resin infusion and curing stages are performed on the joined blade halves. This process is referred to as mold-assisted resin transfer (MART). Of course, the manufacturing arrangement and method according to embodiments of the invention could also be used in a "wet layup" process, in which fiber material such as fiber matting is already infused with resin before laying up; or to manufacture blade halves for which resin infusion and curing are performed separately before joining the cured blade halves together. However, in the following but without restricting the embodiments of the invention in any way, it may be assumed that the fiber distribution is performed as a "dry layup" process.

A pair of tracks can be arranged alongside a blade mold in any suitable manner. Preferably, the manufacturing arrangement comprises a track supporting structure for supporting the tracks of the track pair such that height of the tracks exceeds the height of the blade mold by a certain clearance. In this way, the gantries and tool arrangements can travel over the blade mold at a safe distance. The gantries and tools are moved relative to the blade mold, which preferably remains stationary throughout the fiber layup process.

Preferably, the control arrangement comprises a drive unit arranged in a gantry for moving the gantry along the track pair and/or an actuating unit for actuating a tool arrangement. For example, each gantry can be equipped with a motor to move the gantry along the track pair. To allow a smooth motion, a gantry can have an arrangement of wheels or rollers on each outer end, arranged to move along the tracks. To actuate a tool arrangement, the tool itself may have any number of actuating means such as a stepper motor which can be controlled by the control arrangement. For example, the control arrangement can be realized to run a computer algorithm which issues control commands to such actuating means. One or more algorithms can be realized as a computer program product for carrying out the relevant steps of the method according to embodiments of the invention when the computer program product is loaded into a memory of a programmable device such as a programmable logic controller (PLC) of the control arrangement. Preferably, the control arrangement is operated to move the gantry assemblies from one end of the blade mold to the other, while at the same time controlling the tool arrangements to perform appropriate fiber distribution steps, depending on the position of at least the first gantry and fiber distributor relative to the blade mold.

The control arrangement is preferably operated to issue the respective commands to the actuators of the first and second gantries and the first and second tool arrangements. For example, reels of fiber mats with different material thicknesses can be loaded onto the second magazine, and the second tool arrangement can be controlled to select a specific fiber mat reel, to lift that reel to the winding unit, and to unwind a certain length of fiber mat from that reel and to load that fiber mat length into a fiber mat tool attachment for the fiber distributor. The fiber distributor is then controlled by the control arrangement to collect that loaded tool attachment and to apply the fiber mat length to a specific region in the blade mold. For example, the control arrangement can specify the desired type and length of fiber mat, as well as the orientation of that fiber mat (side-to-side; root-to-tip; diagonally; etc.) according to the position of the first gantry along the blade mold. As indicated above, the control arrangement can control the gantries and the tool arrangements according to their positions relative to the blade mold. A finite-element analysis of a rotor blade model can have been performed previously to determine the minimum material strengths at specific regions of the rotor blade and to determine the minimum loading that needs to be withstood by specific blade regions. Using this information, the control arrangement can determine an optimum fiber material distribution for the entire blade, and can then control the tool arrangements accordingly. The optimal fiber material distribution for a blade type, and the corresponding "choreography" of tool and gantry control steps required to obtain that fiber material distribution, can be defined in a suitable control algorithm or programme By running that programme to carry out the defined steps, it is possible to obtain a plurality of essentially identical rotor blades, each of which has essentially the same quality.

In this way, a very precisely tailored fiber material layup can be achieved. This will later ensure a structurally sound rotor blade which is not heavier than necessary, but which has a favorably long lifetime.

Preferably, each tool arrangement is realized to at least partially traverse its gantry. For example, the fiber distributor can be realized to move over the width of the first gantry, so that the fiber distributor can reach all parts of the inner surface of the mold.

The fiber distributor is preferably realized to automatically distribute or layup fiber material into the blade mold.

To this end, in a preferred embodiment of the invention, the fiber distributor is realized as a robotic tool that can be controlled to perform appropriate functions. The robotic tool may comprise one, two or more arms. Preferably, the fiber distributor is realized as a robot arm which has several degrees of freedom, and which can interface to various tool attachments used for distributing different kinds of fiber material. Such a robot arm on its own and/or connected to a tool attachment may be referred to as the "fiber distributor" in the following.

Fiber material can be, for example, fiber rovings or fiber mats. Fiber rovings may be pre-formed by combining several strands of filament or fiber to give a roving or tow of a desired thickness and/or width and/or strength, and are generally laid from one end of the mold to the other (for example from root end to tip end) to provide an uninterrupted material layer for the rotor blade. Fiber rovings are generally wound on bobbins or reels until they are required. In the context of embodiments of the invention, the expression "fiber material of the first type" is to be understood to comprise fiber rovings, and can comprise glass fiber, carbon fiber, or any other suitable fiber, for example a fiber with a linear mass density (Tex) of about 9600 g per 1000 m. In contrast, fiber mats can be woven, non-woven or "knitted" mats of fiber material with a certain thickness and width. These are used to provide structural stability to the blade. A length of fiber matting is generally wrapped on a drum or a reel until it is required. In the context of embodiments of the invention, the expression "fiber material of the second type" is to be understood to comprise fiber matting.

A rotor blade for a multi-megawatt turbine may have a length of 70 m or more, so that considerable amounts of fiber material are needed to line the mold halves. Therefore, a supply of fiber rovings and/or fiber mats is required. In one approach, the material supply could be monitored so that, when a fiber roving reel is seen to be running low, a replacement reel can be brought and provided to the fiber distributor. However, in a preferred embodiment of the invention, the first tool arrangement comprises a first magazine for storing a sufficient supply of fiber rovings. The term "sufficient supply" may be understood to mean, for example, a supply of fiber rovings that is sufficient for the layup of at least one blade mold half. The fiber rovings can be wound on bobbins, as described above, and several such bobbins can be arranged in the first magazine such that the fiber distributor can automatically fetch a new bobbin and connect to it when the previous bobbin runs empty, so that the distribution of fiber rovings can be performed essentially without interruption or idle time.

The fiber distributor is preferably realized to comprise a robot arm that is able to interface with various tool attachments, as described above. For example, a first tool attachment can be dedicated to the distribution of fiber rovings in the mold. Such a tool attachment may be referred to as a "fiber roving tool attachment" in the following. Preferably, the fiber roving tool attachment of the fiber distributor comprises a fiber in-feed means for feeding in fiber rovings from a rovings supply. For example, a plurality of narrow tubes mounted to the fiber roving tool attachment can be arranged in a cluster, and a roving bundle or tow can be drawn from a bobbin and passed through a tube into the fiber roving tool attachment. A second tool attachment can be dedicated to the distribution of fiber mats in the mold, and such a tool attachment may be referred to as a "fiber mat tool attachment" in the following.

A bundle of fiber rovings is generally treated or primed with some kind of sizing to protect the fibers from damage and to facilitate handling of the rovings. The sizing also acts as a primer which helps the resin bond to the fibers, thereby also improving the structural strength of the finished blade. However, since the sizing effectively stiffens the roving bundle, it makes it difficult to lay the roving into the curved mold. Therefore, in a further preferred embodiment of the invention, the first tool arrangement comprises a breakup unit or "de-sizer" realized to break up the sizing on a bundle of fiber rovings prior to laying them in the blade mold. For example, the breakup unit can comprise a narrow bent tube through which the bundle of rovings is pulled before being laid in the mold. The act of pulling the rovings through such a bent tube can be sufficient to break up the sizing. To ensure complete breakup of the sizing to obtain more flexible rovings, the rovings can be pulled through two such bent tubes. The act of breaking up the sizing does not physically remove the sizing from the rovings. Instead, the hard sizing is "shredded" or "flaked" and remains as shreds within the roving fibers. This ensures that the resin will still be able to bond well to the roving fibers. One or more breakup units can be arranged on the fiber distributor, for example as part of a fiber roving tool attachment, on a robot arm holding the tool attachment, on a magazine that provides a supply of fiber roving bobbins, etc. In either case, a roving from a bobbin can be pulled through a narrow tube of the breakup unit. The breakup unit can comprise any number of tubes, for example an array of tubes, so that the sizing can be broken up on a corresponding number of rovings before being fed out by the fiber roving tool attachment.

Several layers of rovings are generally required in order to obtain the desired material thickness for the rotor blade. However, if rovings are simply laid loosely into the mold, creases or folds may result. Any interruption in the lengthwise direction of a roving means a reduction in its strength. As a result, wrinkles or creases in the rovings can detract from the structural strength of the finished blade and can facilitate fatigue damage. Therefore, in a particularly preferred embodiment of the invention, the fiber distributor is realized to lay or guide a cover sheet onto fiber rovings that it has laid into the mold. In this way, the rovings are essentially immediately subject to pressure, so that they are effectively pressed into the mold. A first layer of rovings can therefore be pressed directly onto the mold surface. Later distributed roving layers can then be effectively pressed onto previously laid roving layers. For each roving layer, the cover sheet ensures that the rovings remain flat and smooth, so that the likelihood of wrinkles or creases developing is essentially ruled out. Since the function of the cover sheet is to apply a weight to the rovings, it may be referred to as a "weighting sheet" or "weighting mat". Of course, the first tool arrangement can also be used to lay the cover sheet directly onto the mold surface in an initial step. To this end, a dedicated tool or tool attachment could be used. Alternatively, the fiber distributor with the fiber rovings tool attachment could be used, but without being fed with any fiber rovings.

While any suitably heavy material may be used as a cover sheet, the cover sheet preferably comprises a material with negligible elasticity in a longitudinal direction, for example with a Young's modulus in the range of 1-5 GPa. For example, the cover sheet or weighting mat can be made of a suitable rubber or synthetic material, preferably with favorable antistatic properties. Preferably, the cover sheet has a material thickness in the range of 2.0 mm to 25.0 mm, more preferably in the range of 5.0 mm to 15.0 mm. Such a material can effectively not be stretched in the lengthwise direction. Since the cover sheet cannot be stretched lengthwise, there is no risk of the rovings being lengthwise compressed or wrinkled by the cover sheet. The cover sheet effectively applies a dead weight onto the rovings, so that these are favorably held in place.

The cover sheet can be laid over the rovings in any suitable manner. For example, a handling tool can follow or track the fiber distributor and lay the cover sheet over the rovings as the first gantry moves along the mold. However, in a preferred embodiment of the invention, the fiber roving tool attachment comprises a guiding means realized to guide the cover sheet through the fiber roving tool attachment, so that the cover sheet can be laid essentially immediately over the rovings (or, in an initial step, directly onto the surface of the mold). In one possible realization, the cover sheet can be wrapped on a reel or drum of the handling tool mounted on the second gantry. The cover sheet can therefore be dispensed by the handling tool. In a first step, the outer end of cover sheet can be fed through the fiber roving tool attachment and fixed or secured to one end of the blade mold, for example at the root end. A suitable clamping means can be used to secure the end of the cover sheet. The fiber roving tool attachment is connected to the fiber roving supply by a fiber in-feed means as described above, and can commence to draw fiber rovings from a number of bobbins, break up the sizing, and feed the rovings through a nozzle or nose and into the mold. Here also, a suitable clamping means can be used initially to ensure that the ends of the rovings are fixed to the root end of the mold in some way, before the first gantry starts to travel down the mold. A clamping means can be realized as a tool such as a hydraulic piston, for example as a free-standing device or arranged on the second gantry, which can apply a sufficient downward force to hold the rovings and/or cover sheet in place. A single clamping means can be used to hold both rovings and cover mat in place.

The first and second gantries are moved smoothly along the tracks in the direction of the mold tip end, so that the fiber roving tool attachment lays a strip of rovings in the root-to-tip direction. At the same time, the cover sheet presses on the immediately laid fiber rovings behind the fiber roving tool attachment. In an alternative embodiment, the first gantry and second gantry can be brought to one end of the mold in an initial step, and the cover sheet can be fixed at that end after guiding it through the fiber roving tool attachment. The second gantry can then be moved to the opposite mold end, so that the weighting mat is laid along the full length of the mold. In a subsequent step, the first gantry is moved towards the other end, so that the fiber roving tool attachment can lay a strip of rovings while at the same time lifting the weighting mat in order to feed the rovings into the mold. In this way, the rovings are effectively laid directly under the cover sheet and are not given any opportunity to develop creases or folds. In the embodiments described above, the fiber roving in-feed means may need to be placed to one side of the fiber roving tool attachment since the fiber distributor must connect to the fiber roving tool attachment from above, and the cover sheet must pass through the body of the fiber roving tool attachment and effectively "blocks" any tip-end face and root-end face of the fiber roving tool attachment. For example, the fiber roving in-feed means can be realized as a cluster of tubes (bent to break up the sizing) protruding from one side face of the fiber roving tool attachment.

In further preferred embodiment of the invention, the cover sheet is realized in two parts, and comprises a first sheet and a second sheet, so that each sheet can be attached at one end to the fiber roving tool attachment. Similarly to the embodiment described above, a fiber roving layup step can be prepared by securing one end of the first sheet to the fiber roving tool attachment, and then unrolling the first sheet from the handling tool on the second gantry as the first gantry is moved towards the tip end of the mold. The outer end of the second cover sheet can also be secured to the fiber roving tool attachment (e.g. on its "tip-end" face), and a reel or drum for rolling up or collecting the second cover sheet can be positioned at the tip end of the mold. The first gantry is then controlled to move towards the tip end, allowing the fiber roving tool attachment to feed out rovings into the mold. At the same time, the first cover sheet is un-wound by the handling tool, while the second cover sheet is re-wound onto the second reel in response to the movement of the first gantry assembly along the track pair. In an alternative embodiment, the fiber distributor itself may be realized to pay out the first cover sheet and roll up or collect the second cover sheet. To this end, for example the fiber roving tool attachment may be realized to support a complete reel of cover sheet on its tip-side face and on its root-side face. In these embodiments, the cover sheet reels can be actuated by the control arrangement as the fiber distributor moves along the mold. Even though these embodiments require two cover sheets, they may be preferable since the fiber roving tool attachment does not need to raise of lift the heavy cover sheet in order to feed the rovings into the mold. Furthermore, these realisations allow a more flexible approach to designing the fiber roving tool attachment. For example, a roving in-feed means can be arranged on either of four vertical faces of an essentially block-shaped fiber-roving tool attachment.

In a preferred embodiment of the invention, the fiber in-feed means is arranged on an upper face of the fiber roving tool attachment. In this way, a "vertical in-feed" is made possible, and no restrictions are placed on the position or placement of the fiber roving material supply. For example, a magazine containing a supply of bobbins for the fiber roving tool attachment can be placed at any convenient point on the first gantry. Its placement is not constrained, as might be the case for a lateral placement of the fiber in-feed means.

A considerably quantity of fiber matting is also required in the layup of a large rotor blade. Therefore, in a further preferred embodiment of the invention, the second tool arrangement comprises a second magazine for storing a sufficient supply of fiber mats. Here also, the term "sufficient supply" may be understood to mean, for example, a supply of fiber mats that is sufficient for the layup of at least one blade mold half. For example, several reels of fiber mats can be arranged in the second magazine.

The method according to embodiments of the invention allows the efficiency of the fiber distribution process to be optimized. For example, in a preferred embodiment of the invention, the second tool arrangement can comprise a feeding tool realized to provide fiber mats to the first tool arrangement. The feeding tool can, for example, transfer a length of fiber mat from a reel to a fiber mat tool attachment. In other words, the feeding tool can "load" such a fiber mat tool attachment, and can "park" the tool attachment in readiness for the fiber distributor, which can "collect" the loaded tool attachment and proceed to apply the fiber mat to the mold. Preferably, the second magazine is equipped with a feeding tool that can prepare at least one such additional fiber mat tool attachment while the fiber distributor is busy with another fiber mat tool attachment. In this way, the fiber mats can be distributed or laid up without any interruption, since a loaded tool attachment can always be ready and waiting for the fiber distributor.

Different sections or regions of a wind turbine rotor blade have different requirements regarding structural strength and flexibility. While it is important to ensure a certain minimum material thickness, it is also important to consider the different loading effects that act on the various blade regions during operation of the wind turbine. The method and manufacturing arrangement according to embodiments of the invention allow these aspects to be taken into account in a very efficient manner during the fiber material layup stage. To this end, in a preferred embodiment of the invention, the second tool arrangement is realized to select a specific type of fiber mat and/or to cut a specific length of a fiber mat.

In a preferred embodiment of the invention, the second tool arrangement comprises a lifting tool for lifting a fiber matting reel from the fiber material supply to the winding unit. This could be achieved in any suitable way. However, in a preferred embodiment of the invention, the second gantry comprises a robust framework in which the fiber mat supply can be stored, for example in a sloping array so that each reel of fiber matting is accessible from above. Preferably, the lifting tool comprises a carriage realized to traverse the magazine framework in a side-to-side manner, and a gripping arrangement (for example a pair of hooks) to lift a fiber mat reel into the winding unit. To this end, in a preferred embodiment of the invention, the lifting tool preferably comprises an actuator for actuating the carriage and/or for actuating the gripping arrangement in order to select a fiber matting reel for loading into the winding unit. These actuators can be controlled by the control arrangement.

The manufacturing line according to embodiments of the invention is not limited to use with just one pair of blade halves. In a further embodiment of the invention, the track pairs of each manufacturing arrangement are preferably arranged to accommodate a plurality of blade molds arranged sequentially between the tracks. For example, a first row of upper blade half molds can be arranged root-to-tip between the tracks of the first manufacturing arrangement, while a second row of lower blade half molds can be arranged root-to-tip between the tracks of the second manufacturing arrangement. When the fiber layup for a first pair of blade halves is complete, the gantries and tool arrangements can simply progress along the tracks to commence layup in the next pair of blade mold halves. In the meantime, the root end of the first blade can be prepared, for example by placing a root bushing ring into the finished lower mold half; turning the finished upper mold half and lowering it onto the lower mold half; sealing the mold halves; and performing an infusion and curing process such as the VARTM process.

BRIEF DESCRIPTION

Some of the embodiments will be described in detail, with reference to the following figures, wherein like designations denote like members, wherein.

In the diagrams, like numbers refer to like objects throughout. Objects in the diagrams are not necessarily drawn to scale.

DETAILED DESCRIPTION

Figure 1:
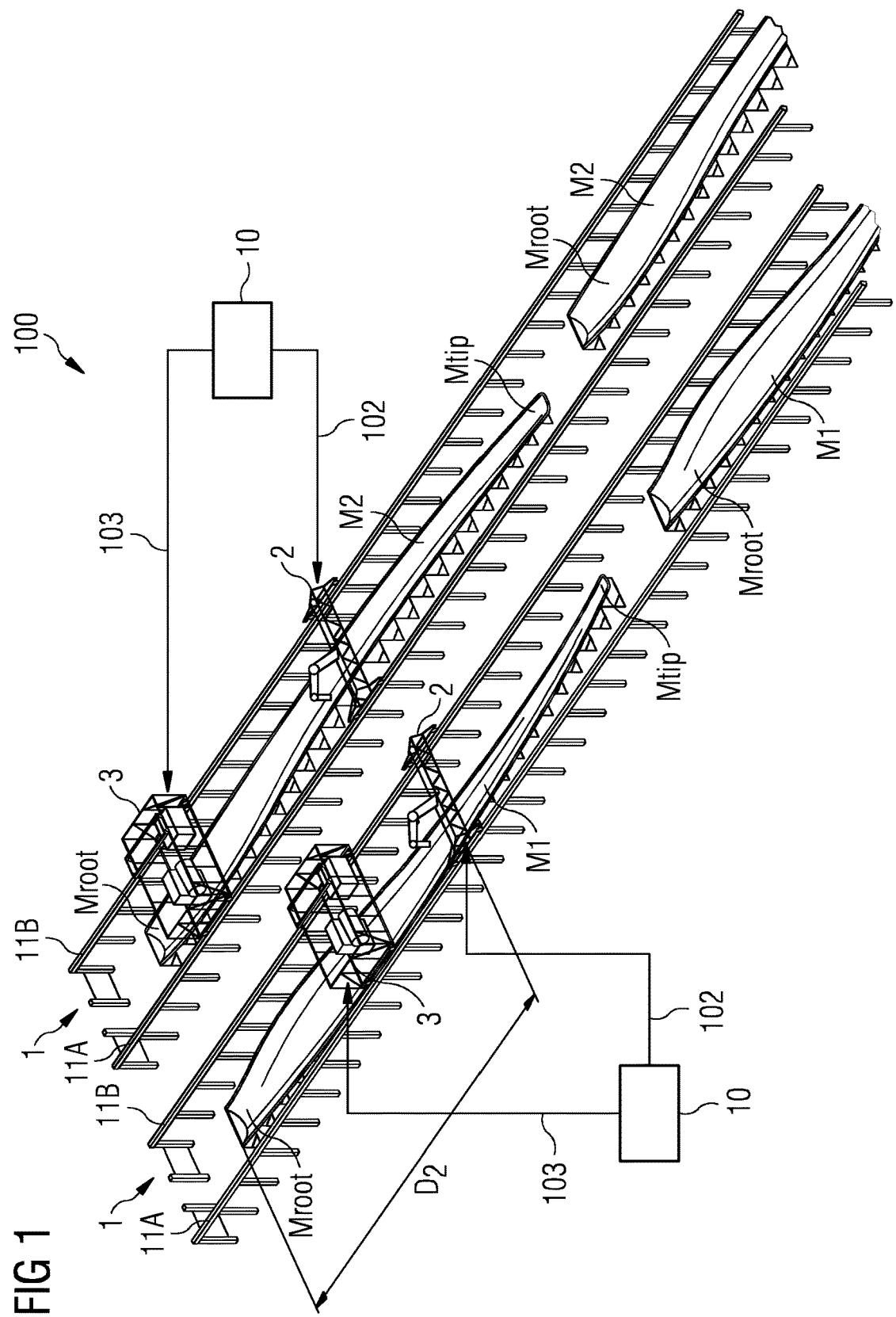
FIG. 1 is a schematic representation of an embodiment of a manufacturing line.

FIG. 1 is a schematic representation of an embodiment of a manufacturing line 100 according to embodiments of the invention. This exemplary embodiment of the manufacturing line 100 consists of two manufacturing arrangements 1, each of which is dedicated to the construction of a specific type of blade half. For example, one manufacturing arrangement 1 is used to make the upper halves, and comprises a pair of tracks 11A, 11B arranged alongside a row of upper blade half molds M1. The other manufacturing arrangement 1 is used to make the lower halves, and also comprises a pair of tracks 11A, 11B, in this case the tracks 11A, 11B are arranged alongside a row of lower blade half molds M2.

Each manufacturing arrangement 1 has a first gantry 2 and a second gantry 3, arranged so that the gantries 2, 3 span the tracks 11A, 11B and can move along the tracks 11A, 11B. A control unit 10 controls the travel of each gantry 2, 3 along the track pair 11A, 11B, and issues control signals 102, 103 to move the gantries 2, 3 separately or together, at the same rate (synchronously) or at different rates, as required. The diagram shows separate control units 10 for each manufacturing arrangement 1, but it should be understood that the gantries 2, 3 of each manufacturing arrangement 1 could by controlled by a common controller.

Various tool arrangements (not shown in this diagram) are mounted on the gantries 2, 3. The tool arrangements and the gantries 2, 3 are operated to perform fiber layup steps in a coordinated manner so that fiber mats and fiber rovings are laid between the root end M root and tip end $M_{tip}$ of each mold half M1, M2. During the layup procedure, the control unit 10 can regard the first gantry 2 of a manufacturing arrangement 1 as a "master gantry", and can control the operation of the second gantry 3 ("slave gantry") and the second tool arrangement according to the requirements of the first tool arrangement and the position of the first gantry 2 relative to the mold. For example, the control unit 10 can track the layup rate of the fiber distributor, and can take the necessary steps to ensure that a tool attachment is loaded and ready for the fiber distributor, and can move the second gantry into place so that the robot arm of the fiber distributor can unload an "empty" tool attachment and collect a new, loaded tool attachment. The type and/or quantity and/or direction of fiber material being laid can be determined by the control arrangement 10 according to the position $D_2$ of the first gantry 2 along the mold M1, M2. Both manufacturing arrangements 1 can be operated at the same time. In this way, an upper blade half and a lower blade half can be simultaneously prepared. Once the dry layup is completed for a pair of mold halves M1, M2, the gantries 2, 3 are moved on to the next pair of mold halves M1, M2, while the first mold pair can be joined in preparation for a VARTM resin infusion and curing procedure. This manufacturing line 100 and method according to embodiments of the invention significantly reduce the blade-in-mold time and can therefore lower the overall manufacturing costs of wind turbine rotor blades.

Figure 2:
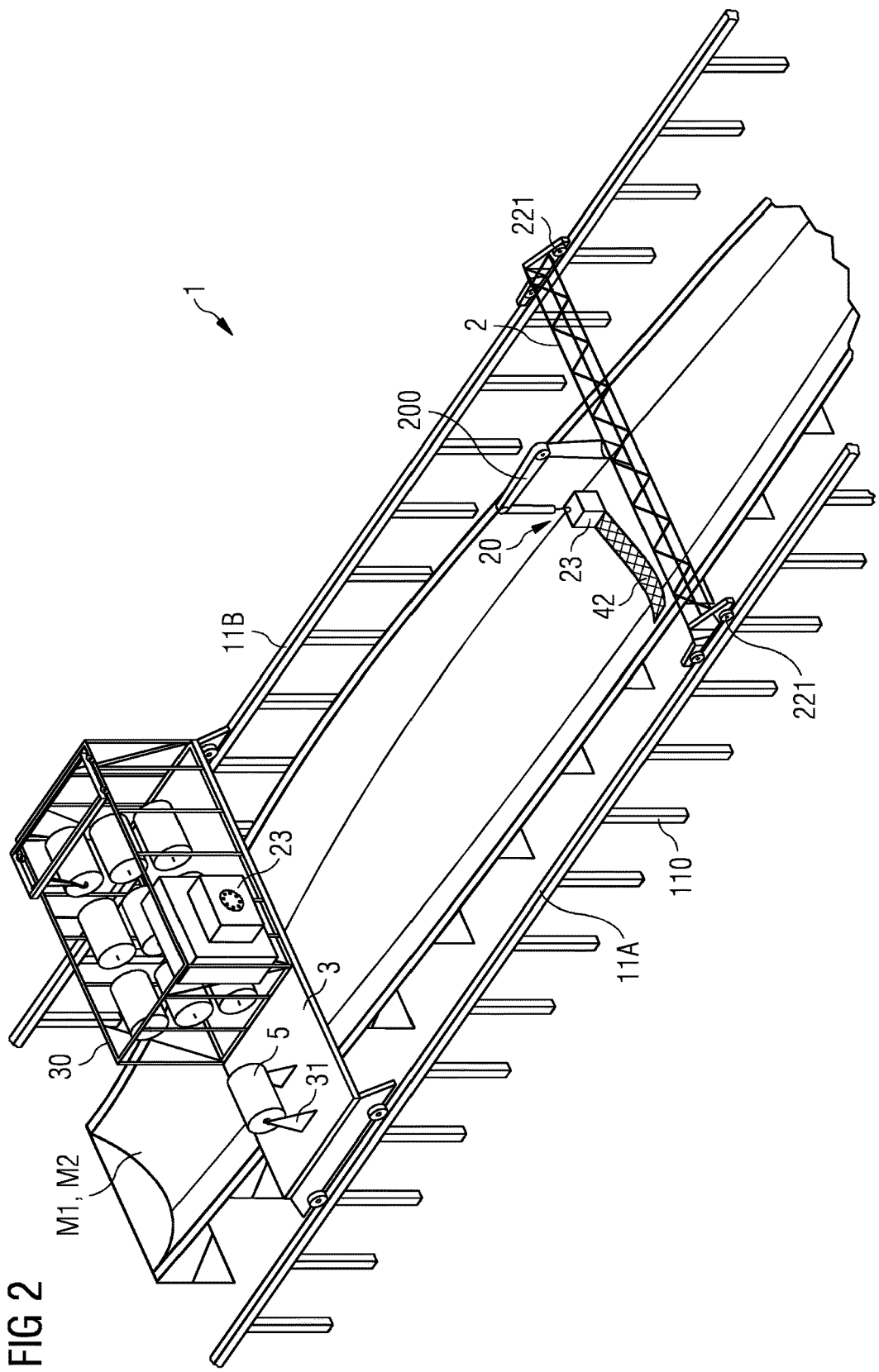
FIG. 2 is a schematic representation of an embodiment of a manufacturing arrangement.

FIG. 2 is a schematic representation of an embodiment of a manufacturing arrangement 1 according to embodiments of the invention at an initial stage in the fiber layup process. The diagram shows a section of a blade mold M1, M2, and the gantries 2, 3 positioned above the mold M1, M2. The gantries 2, 3 are equipped with rollers 221 and drive means (not shown) to allow smooth travel along the tracks 11A, 11B in either direction, as indicated by the arrow. The tracks 11A, 11B are arranged along a suitable arrangement of supporting legs 110.

The first gantry 2 carries a fiber distributor 20, realized as a robot arm 200 with several degrees of freedom. The robot arm 200 can operate various tool attachments. The diagram shows a fiber mat tool attachment 23 being used to apply a length of fiber mat 42 to the inside of the mold M1, M2. The fiber mat 42 of a desired fiber mat type has already been cut to the desired length by a winding unit arranged in a magazine 30 of the second gantry 3, as will be explained with the aid of FIG. 5. The diagram also shows a further tool 31 realized to hold a cover sheet 5 which has been wrapped about a reel or drum. The cover sheet 5 will be used to weigh down fiber rovings as these are being laid, as will be explained with the aid of FIG. 3.

Figure 3:
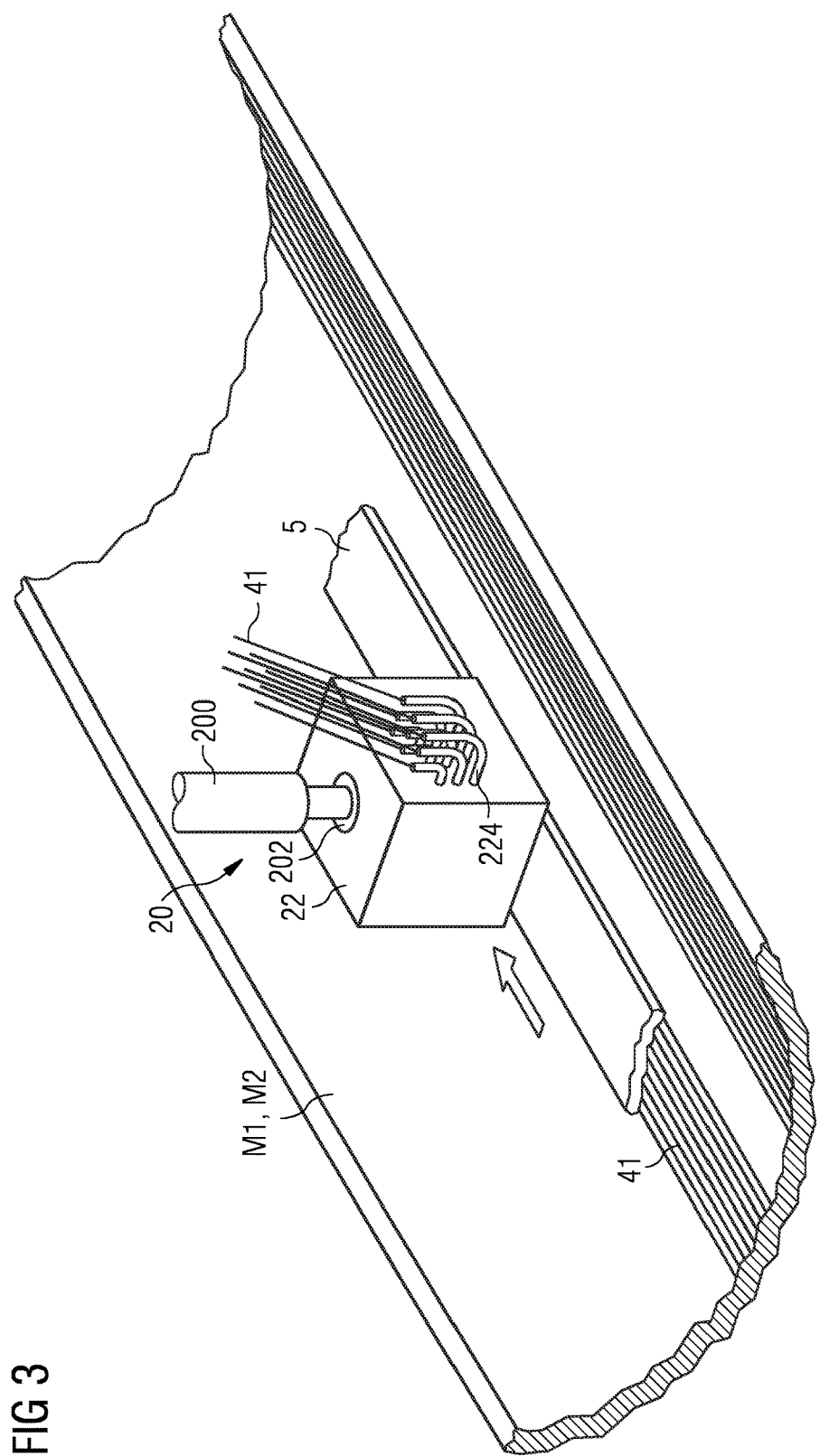
FIG. 3 is a schematic representation of an embodiment of the manufacturing arrangement of FIG. 2 at a subsequent stage.

FIG. 3 is a schematic representation of the manufacturing arrangement of FIG. 2 during another stage. The diagram shows the robot arm 200 of the fiber distributor 20 connected to a fiber roving attachment tool 22. This tool attachment 22 draws in fiber roving 41 from a bobbin (not shown). The roving 41 or tow 41 is pulled through a curved tube 224 to break up and remove any sizing. Inside the tool attachment 22, an arrangement of rollers (not shown) feeds the roving 41 onto the surface of the mold M1, M2. To ensure that the roving 41 is pressed against the surface of the mold M1, M2, the tool attachment 22 is realized to apply the rovings 41 underneath a cover sheet 5, which acts to weigh down the rovings 41 as they are applied. In this embodiment, the cover sheet 5, which already extends over a length of the blade surface (for example from root end to tip end), is fed through the tool attachment 22 which can raise the cover sheet 5 so that rovings 41 can be applied to the mold M1, M2. As the first gantry with this tool attachment 22 moves along the tracks, it lifts the cover sheet 5 and simultaneously applies fiber roving 41 to the blade mold M1, M2. In this way, the rovings 41 are optimally pressed onto the blade surface M1, M2. Additionally, if desired, an underpressure can be applied to the mold M1, M2 by extracting air from between the mold surface and the rovings 41.

Figure 4:
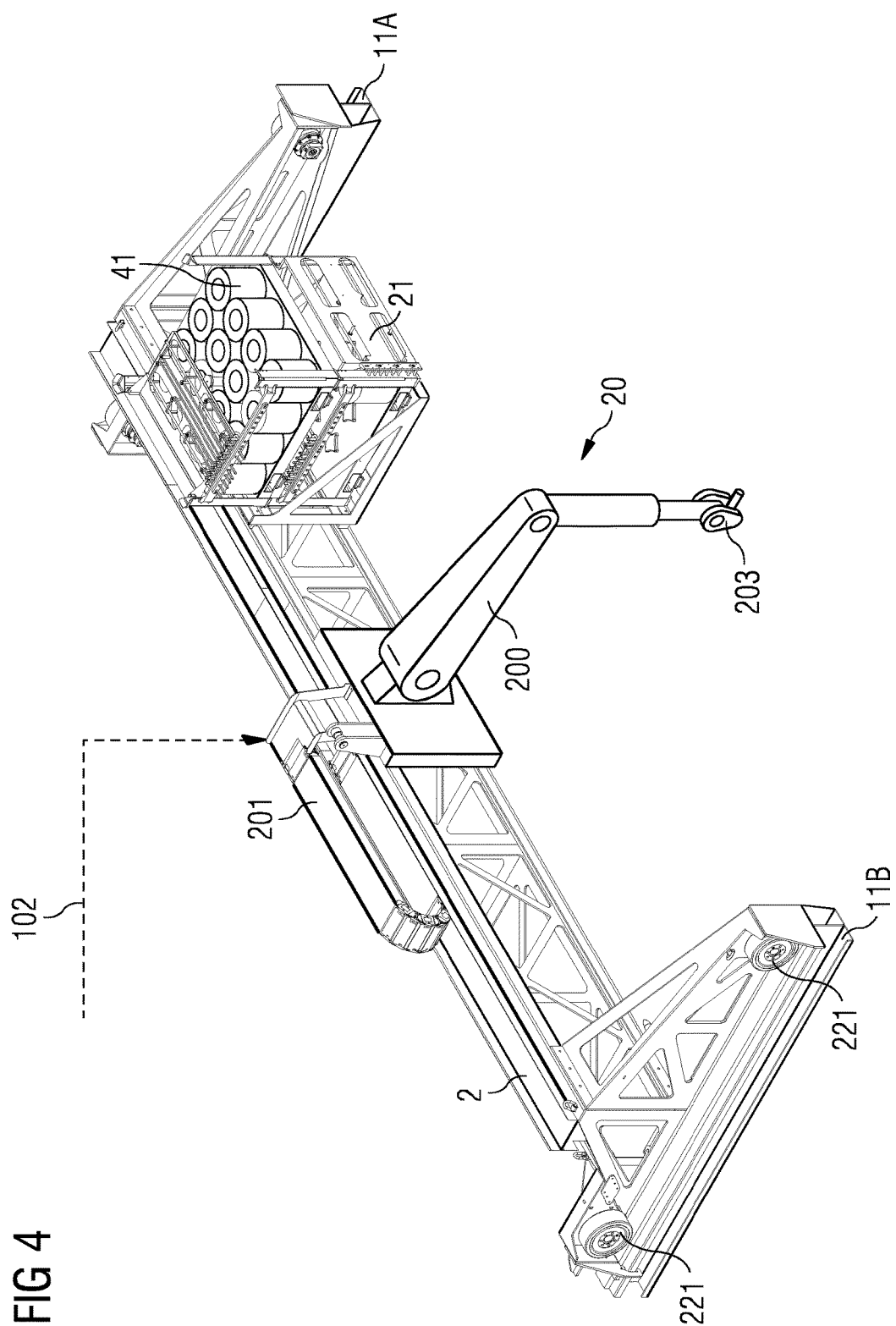
FIG. 4 is detailed schematic representation of an embodiment of a first gantry for a manufacturing arrangement.

FIG. 4 is schematic representation of an embodiment of a first gantry 2 for a manufacturing arrangement according to embodiments of the invention. In this embodiment, the gantry 2 has rollers 221 on each outer end so that the gantry 2 can roll along the tracks 11A, 11B. The diagram shows a fiber distributor 20 with a robot arm 200 and a connector 203 for connecting to various tool attachments as described above. In this embodiment, a first magazine 21 has been lifted onto the first gantry 2. To this end, the first gantry 2 can be equipped with a support, and a forklift device can be used to lift the first magazine 21 into place onto the support. The first magazine 21 carries a supply of bobbins with fiber roving 41. The robot 20 can access this supply of fiber roving 41 to ensure that the fiber roving tool attachment 22 can be used efficiently. The operation of the fiber distribution robot 20 is controlled by signals 102 issued by the control arrangement (not shown).

Figure 5:
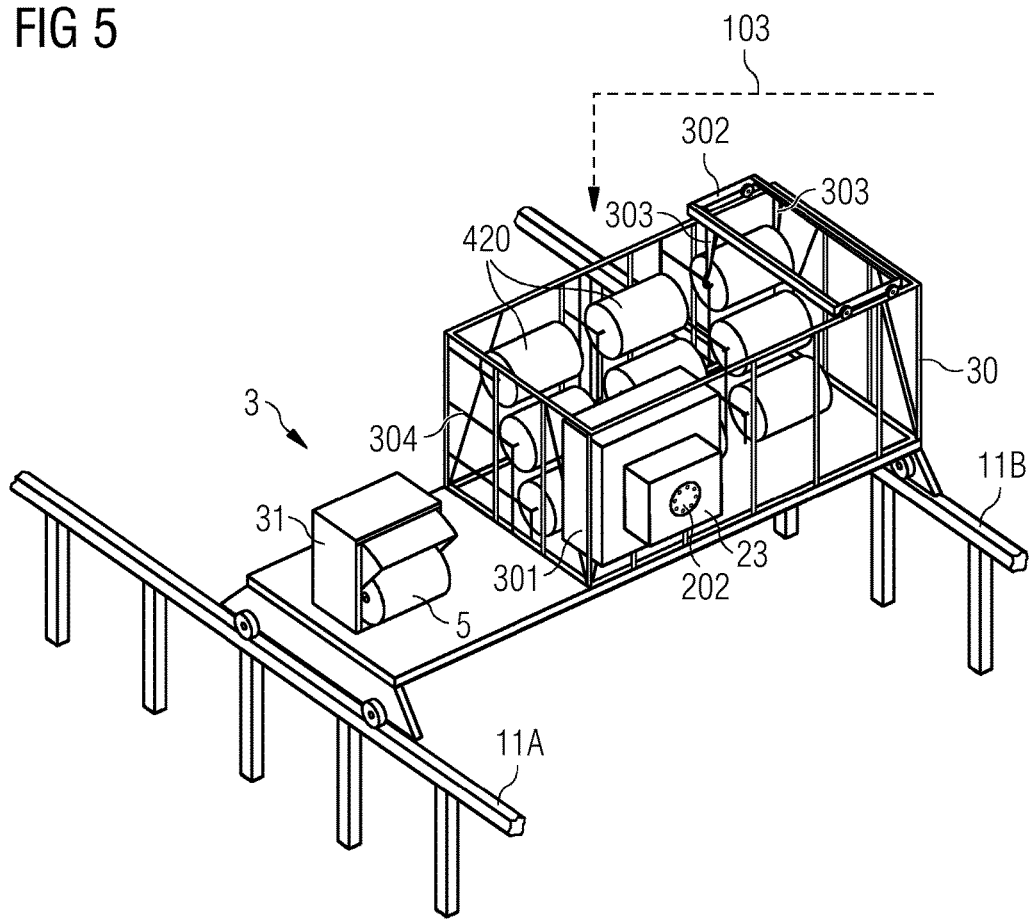
FIG. 5 is detailed schematic representation of an embodiment of a fiber mat magazine for a manufacturing arrangement.

FIG. 5 is detailed schematic representation of an embodiment of a second magazine 30 for a manufacturing arrangement according to embodiments of the invention, arranged on the second gantry 3, which is realized to span the tracks 11A, 11B of the manufacturing arrangement. The second magazine 30 comprises a rack 304 for holding a supply of fiber matting wrapped on reels or drums 420, and a carriage 302 which can traverse the second magazine 30 in a side-to-side fashion so that a gripper 303—for example a pair of hooks—can access each of the fiber mat reels 420. The second magazine 30 is also equipped with an actuator—e.g. a drive unit and a roller/track arrangement (not shown)—for effecting a movement of the carriage 302 and a gripping action of the gripper 303. In this way, the control arrangement (not shown) can control the second tool arrangement to load the winding unit 301 with a certain type of fiber matting, and can instruct the winding unit 301 to transfer a specific length of the fiber matting to a fiber mat tool attachment 23. The second magazine 30 is realized to place the loaded tool attachment 23 in readiness for the fiber distributor, which can connect to the tool attachment 23 by means of a robot connector interface 202, and can lift it off the second magazine 30. The operation of the second magazine 30 with its winding/cutting unit 301, carriage 302, gripper 303 and actuator is controlled by signals 103 issued by the control arrangement (not shown).

The diagram also shows a cover sheet 5 wrapped on a drum and supported by a dispenser 31 or handling tool 31 which can dispense the cover sheet 5 or re-wind the cover sheet 5 as required during a fiber roving distribution step. In this embodiment, the second magazine 30 is shown to share the second gantry 3 with the cover sheet dispenser 31. In an alternative arrangement, the second magazine 30 could extend across the second gantry 3, so that the rack 304 could store a greater supply of fiber mat reels 420. In a further alternative, the second magazine 30 could accommodate two winding units 301, so that several tool attachments 23 could be primed with certain specific lengths of fiber matting in readiness for use by the fiber distributor.

The second magazine 30 can also be used to store a fiber roving tool attachment, i.e. to hold such a tool attachment in readiness for the robot arm. The second gantry 3 can also be realized to hold a supply of fiber roving bobbins, and may also be realized to feed the fiber roving to a fiber roving tool attachment during a roving distribution procedure.

In a further development of the functionality of the second gantry, a piston or roller arrangement (not shown) can be used to apply pressure to a layer of fiber material laid by the fiber distribution tool, or to a cover sheet covering a layer of fiber material.

Figure 6:
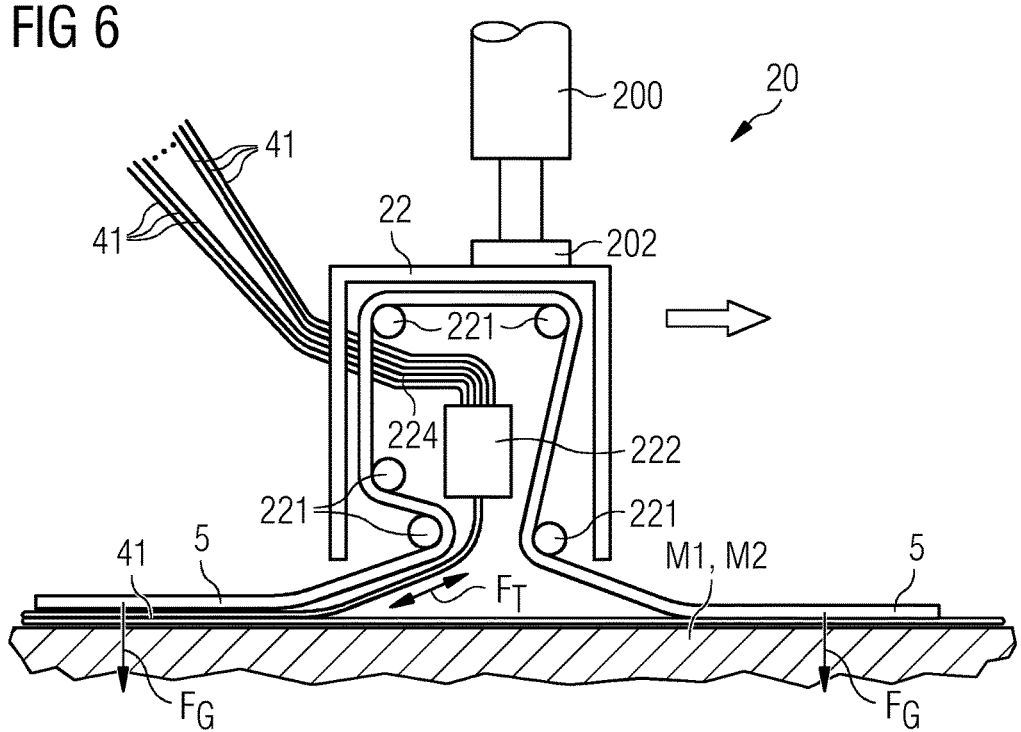
FIG. 6 shows a schematic cross-section through a first embodiment of a tool attachment of the manufacturing arrangement.

FIG. 6 shows a simplified cross-section through a fiber roving tool attachment 22 during a roving laying step. A cover sheet 5 has been laid over the length of the mold M1, M2 between root end and tip end. The robot arm 200 of the fiber distribution tool 20 is connected to the fiber roving tool attachment 22 by means of an interface 202, which can be a standard connector known from automated assembly lines, containing control signal interface and power supply lines for any drive unit in the fiber roving tool attachment 22. In this realization, the fiber roving tool attachment 22 is constructed to allow the cover sheet 5 to pass through the fiber roving tool attachment 22 over an arrangement of rollers 221. In this way, the fiber roving tool attachment 22 can lift the cover sheet 5 away from the mold M1, M2 in the region below the fiber roving tool attachment 22. Fiber rovings 41 are fed to the fiber roving tool attachment 22 from a supply of bobbins as described above. The sizing is broken up by drawing the rovings 41 through an arrangement of bent tubes 224 of a fiber feed-in means 224, which is arranged at one side face of the fiber roving tool attachment 22. The rovings 41 arriving through the feed-in means 224 can then be combined into a strip with a certain desired width. A drive unit 222 is mounted inside the fiber roving tool attachment 22 and can move from side to side (i.e. into or out of the plane of the drawing) and can feed the strip of rovings 41 out onto the mold M1, M2. The drive unit 222 is arranged so that the rovings are laid directly onto the mold M1, M2 underneath the heavy cover sheet 5, whose weight $F_G$ presses the rovings 41 effectively onto the mold M1, M2. The cover sheet 5 can be a synthetic rubber mat 5 with a thickness of about 10.0 mm. At the same time, the drive unit 222 can apply a desired tension $F_T$ to the rovings 41 as they are being fed out. The combination of the weight $F_G$ of the cover sheet 5 and the tension $F_T$ applied by the fiber roving tool attachment 22 ensures that the roving 41 will not wrinkle as it is laid in the mold. Although this diagram shows an arrangement of five rollers 221, an embodiment with only two rollers placed in the lower region of the tool attachment is also conceivable.

Figure 7:
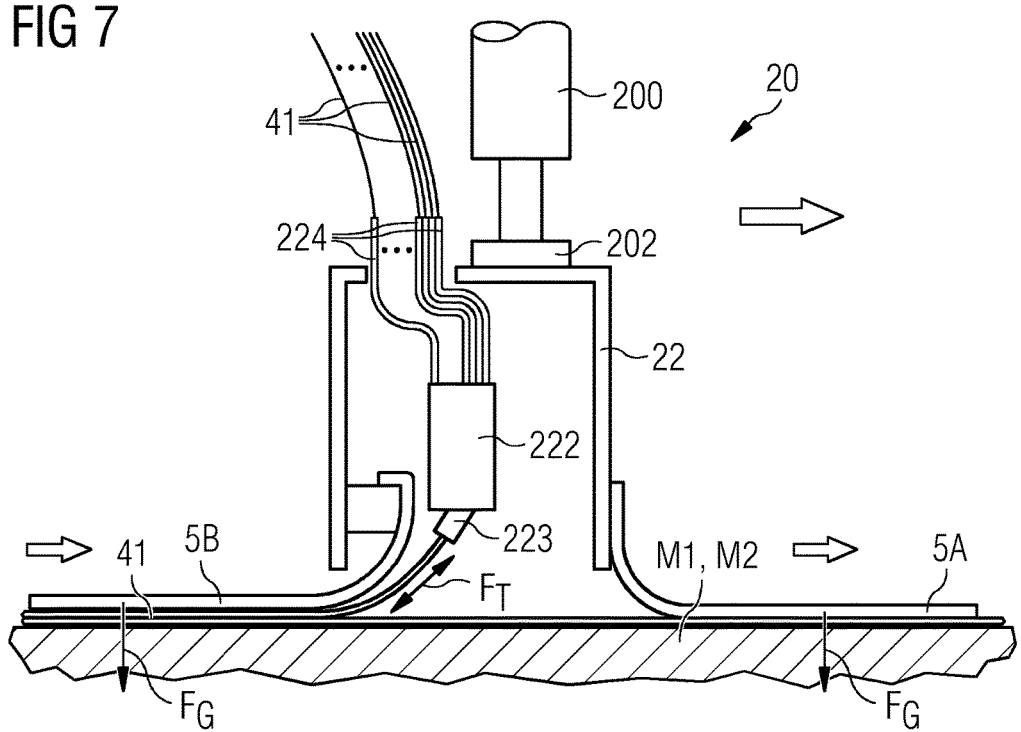
FIG. 7 shows a schematic cross-section through a second embodiment of a tool attachment of the manufacturing arrangement.

FIG. 7 shows a simplified cross-section through another embodiment of a fiber roving tool attachment 22 during a roving laying step. In this embodiment, one cover sheet 5A has been laid over the length of the mold M1, M2 between root end and tip end, and secured at one end to the tool attachment 22, in this case to the "tip-end face" of the tool attachment 22. The other end of this cover sheet 5A can be re-wound onto a reel or drum mounted as the tool attachment 22 moves towards the tip end of the mold M1, M2. One end of a second cover sheet 5B is secured to the "root-end face" of the tool attachment 22 and can be unrolled from a reel when the tool attachment 22 moves towards the tip end in the direction shown. Here also, the robot arm 200 is connected to the fiber roving tool attachment 22 by means of a standard interface 202. In this embodiment, the fiber roving tool attachment 22 does not need to actually lift the cover sheet away from the mold M1, M2, so that its realization is less complex. This embodiment allows a fiber in-feed 224 to be mounted on top of the fiber roving tool attachment 22. Here also, a drive unit 222 as described above is mounted inside the fiber roving tool attachment 22 and can feed the strip of rovings 41 out onto the mold M1, M2. The drive unit 222 is arranged so that the rovings are laid directly onto the mold M1, M2 underneath the second cover sheet 5B, whose weight $F_G$ presses the rovings 41 effectively onto the mold M1, M2. At the same time, the drive unit 222 can apply a desired tension $F_T$ to the rovings 41 as they are being fed out. The first cover sheet 5A ensures that previously laid layers of rovings 41 are continually weighed down.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:
1. A manufacturing arrangement for the manufacture of a rotor blade, comprising:
 a pair of tracks arranged along longitudinal sides of a blade mold;
 a first gantry assembly configured to span the pair of tracks and to carry a first tool arrangement, the first tool arrangement comprising at least a fiber distributor;
 a second gantry assembly configured to span the pair of tracks and to carry a second tool arrangement; and
 a control arrangement configured to effect a coordinated movement of the first gantry assembly and the second gantry assembly along the pair of tracks and to coordinate an operation of the second tool arrangement with an operation of the first tool arrangement.

2. The manufacturing arrangement according claim 1, wherein the fiber distributor is configured to distribute a fiber material into the blade mold.

3. The manufacturing arrangement according to claim 1, wherein the first tool arrangement comprises a first magazine for storing a fiber material of a first type.

4. The manufacturing arrangement according to claim 3, wherein the second tool arrangement comprises a second magazine for storing the fiber material of a second type.

5. The manufacturing arrangement according to claim 1, wherein the second tool arrangement is configured to provide a fiber material to the first tool arrangement.

6. The manufacturing arrangement according to claim 1, comprising a fiber handling arrangement configured to select a specific fiber material and/or to cut a specific length of a fiber material and/or to load a tool attachment of the fiber distributor with a quantity of the fiber material.

7. The manufacturing arrangement according to claim 1, wherein the first tool arrangement is configured to at least partially traverse its gantry.

8. The manufacturing arrangement according to claim 1, wherein the control arrangement comprises a drive unit arranged on a gantry for moving the gantry along the pair of tracks and/or an actuating unit for actuating a the first tool arrangement.

9. The manufacturing arrangement according to claim 1, comprising a track supporting structure for supporting the tracks of the pair of tracks such that a height of the tracks exceeds a height of the blade mold.

10. A manufacturing line for the manufacture of wind turbine rotor blades, the manufacturing line comprising:
 a first manufacturing arrangement according to claim 1 for manufacturing an upper blade half, wherein the pair of tracks is arranged along the longitudinal sides of an upper blade mold; and
 a second manufacturing arrangement for manufacturing a lower blade half, wherein the pair of tracks is arranged along the longitudinal sides of a lower blade mold;
wherein control arrangements of the first manufacturing arrangement and the second manufacturing arrangement are configured to coordinate an operation of the tool arrangements such that the upper blade half and the lower blade half are manufactured simultaneously.

11. The manufacturing line according to claim 10, wherein the pair of tracks of each of the first manufacturing arrangement and the second manufacturing arrangement are arranged to accommodate a plurality of blade molds arranged sequentially between the pair of tracks.

12. A method of manufacturing a rotor blade, the method comprising the steps of:
 (A) arranging a pair of tracks along longitudinal sides of a blade mold;
 (B) arranging a first gantry assembly to span the pair of tracks and placing a first tool arrangement on the first gantry assembly;

(C) arranging a second gantry assembly to span the pair of tracks and placing a second tool arrangement on the second gantry assembly; and (D) operating a control arrangement to effect a coordinated movement of the first gantry assembly and the second gantry assembly along the pair of tracks and to coordinate an operation of the second tool arrangement with an operation of the first tool arrangement.

13. The method according to claim 12, wherein the control arrangement is operated to control a fiber handling arrangement of the second tool arrangement to feed a specific length and/or a specific quantity of a fiber material to a tool attachment.

14. The method according to claim 12, wherein the control arrangement is operated to move the first gantry assembly and the second gantry assembly from a root end ($M_{root}$) of the blade mold to a tip end ($M_{tip}$) of the blade mold.

15. The method according to claim 12, wherein the control arrangement is operated to control the first gantry assembly and the second gantry assembly and/or the first tool arrangement and the second tool arrangement on a basis of a position of a gantry assembly relative to the rotor blade mold.

16. A wind turbine rotor blade manufactured using the method according to claim 12.

* * * * *